Sept. 12, 1939.  A. A. PROBECK  2,172,806
METHOD OF MAKING BEAMS
Filed June 14, 1938
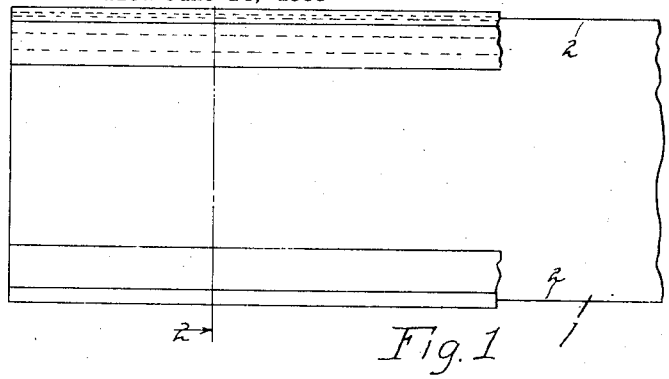
Fig. 1
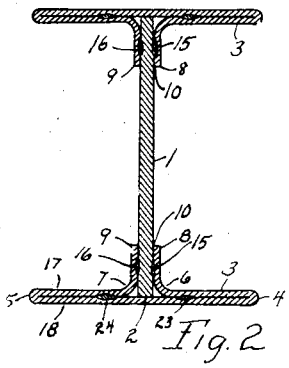
Fig. 2
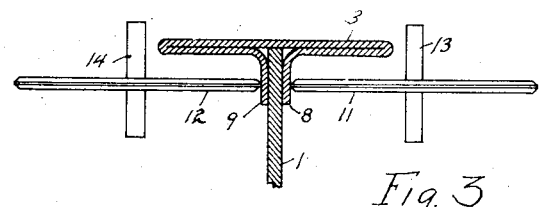
Fig. 3
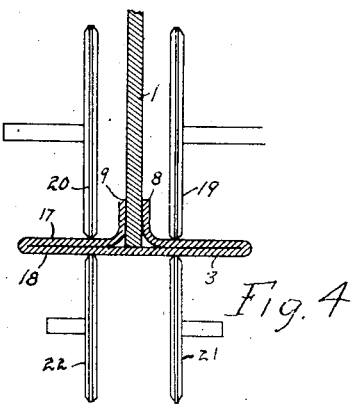
Fig. 4
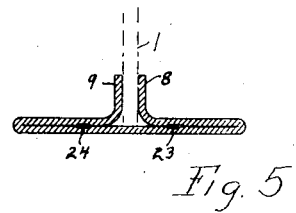
Fig. 5
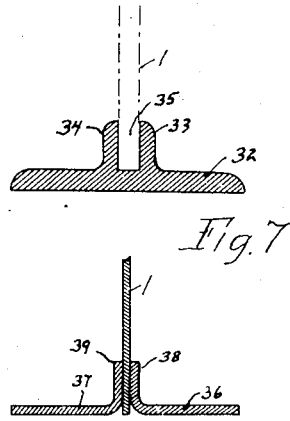
Fig. 7
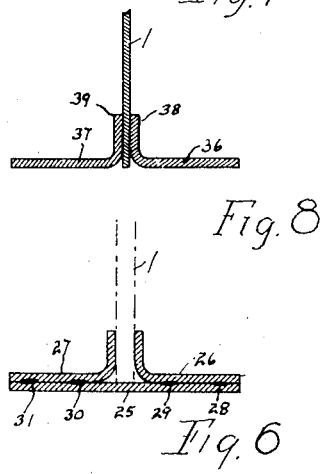
Fig. 8
Fig. 6
INVENTOR.
Armand A. Probeck
BY Harry R. Canfield
ATTORNEY.

Patented Sept. 12, 1939

2,172,806

UNITED STATES PATENT OFFICE 2,172,806

METHOD OF MAKING BEAMS

Armand A. Probeck, Cleveland, Ohio, assignor to The Federal Machine and Welder Company, Warren, Ohio, a corporation of Ohio Application June 14, 1938, Serial No. 213,615

13 Claims. (Cl. 29—155)

This invention relates to metal beams and the like and to methods for making them.

The well known method of making metal beams, such for example, as I-section and T-section beams, is to hot roll the beams from ingots between suitably formed mill rolls.

There is, however, a practical limit to the sectional shape and dimension of beams made by this method, that is to say, a beam having a given thickness of web or flange cannot be made by rolling if the web depth or flange width is greater than a certain maximum. There are, however, many uses for beams having webs and flanges of greater depth and width in proportion to the thickness thereof than is possible by rolling, and it is the primary object of this invention to provide such a beam and the method of making it.

Another object is to provide a beam which can be fabricated from pieces of pre-rolled sheets of metal welded together and a method for making such a beam.

Another object is to provide generally an improved metal beam and a method of making it.

Other objects will be apparent to those skilled in the art to which my invention appertains.

My invention is fully disclosed in the following description taken in connection with the accompanying drawing in which:

Fig. 1 is a side elevational view of a fragment of an I-section beam made according to my invention;

Fig. 2 is a sectional view taken from the plane 2 of Fig. 1;

Fig. 3 is a view in some respects diagrammatic illustrating a part of the method of making the beams of Figs. 1 and 2, and illustrating also the method of making a beam of T-section;

Fig. 4 is a view similar to Fig. 1, illustrating another step which may optionally be employed in making an I-beam, such as shown in Figs. 1 and 2, or a T-section beam;

Fig. 5 is a sectional view illustrating the construction of a beam flange, which may be utilized in beams made according to my invention.

Figs. 6 and 7 are views similar to Fig. 5 illustrating modifications;

Fig. 8 is a view illustrating another construction by which I-beams or T-beams may be made by the practice of my invention.

Referring to Figs. 1 and 2 of the drawing which illustrates a beam of I-section, made according to my invention, I have shown at 1 the web of the beam, the same being a strip of sheet metal, such for example, as steel, having parallel upper and lower edges 2—2 and of the length of the desired finished beam.

At 3—3 are the beam flanges and these are formed preferably by rolling or bending operations from a strip of sheet metal, such, for example, as steel, having substantially parallel opposite edges. The opposite edge portions of the sheet are rolled or bent into overlapping relation to the intermediate portion of the sheet providing rounded edges as at 4 and 5, and the edge portions are rolled or bent upwardly as at 6 and 7 to provide substantially parallel spaced-apart, longitudinally extending wings 8 and 9, providing a groove 10 therebetween which is made substantially the same thickness as the web 1.

The flange thus made is of twice the thickness of the sheet metal from which it is formed. The edges 2—2 of the web 1 are then inserted into grooves 10—10 of two such flanges 3—3 and the web and wings 8 and 9 are welded together.

This welding operation is preferably performed as illustrated diagrammatically in Fig. 3. Electrodes 11 and 12 of the disc or wheel type, rotating with or on shafts 13 and 14 respectively, are moved into pressure engagement with the wings 8 and 9 on the opposite outer sides thereof, and electric current is caused to flow from one electrode to the other through the wings 8 and 9 and through the web 1, effecting welds, as indicated at 15 and 16, in Figs. 1 and 2, the welds integrally joining the wings 8 and 9 to opposite faces of the web 1.

Preferably the wings 8 and 9 and the web 1 are fed continuously through and between the electrodes 11 and 12 so that the welds 15 and 16 are continuous linear welds, as shown for the weld 15 in Fig. 1, throughout the length of the beam, although in some cases successive welds of limited length, of the nature of spot-welding, may be utilized, for example, by periodically interrupting the flow of current, while the parts are being continuously fed through the electrodes.

In some cases, particularly when the metal of the flanges 3—3 is relatively thin and the overall width of the flange is relatively great, it may be desired to weld together the inner and outer overlapping portions 17 and 18 of the flange and this may be accomplished as is illustrated diagrammatically in Fig. 4. Upper wheel or disc type electrodes 19 and 20 engage the upper layer 17 of the flange and other similar electrodes 21 and 22 engage the under side thereof opposite the electrodes 19 and 20 and the flange is preferably fed continuously through the electrodes while in pressure engagement therebetween and electric current is caused to flow from the electrodes 19 and 20 to the electrodes 21 and 22, forming welds as indicated at 23 and 24 in Fig. 2, which welds are preferably continuous linear welds, but as stated above, may be discontinuous or spot welds.

The welds 23 and 24 may be made simultaneously, as illustrated in Figs. 4, or they may be made one at a time, if preferred.

In some cases it may be desirable to first weld the flanges to the web by the welds 15 and 16 before making the welds 23 and 24, and in other cases, it may be desirable to first weld the flanges integrally together by the weld 23 and 24, as shown for the completed flange in Fig. 5.

In Fig. 6 is shown a modified form of flange. Two angle section pieces of metal 26 and 27 are superimposed upon a flat strip of metal 25, and welded thereto at 28, 29, 30 and 31. The upstanding legs or wings 8 and 9 of the angle section pieces, are spaced apart and provide the groove 10 for receiving the web 1.

When this form of flange is used, it may first be made complete as shown in Fig. 6, and the web 1 welded thereto; or the angle section pieces 26 and 27 may be first welded to the web 1, as described above, then the strip 25 may be welded to the angle section. In either case, the methods shown in Figs. 3 and 4 may be employed.

In Fig. 7 is shown another form of flange which in some cases may be employed. This flange is a rolled flange, hot rolled from a single piece of metal and comprising a flange proper 32 and upstanding wings 33 and 34 having therebetween a groove 35 corresponding to the thickness of the web 1, and the wings 33 and 34 may be welded to the web 1, as described above.

In Fig. 8 is shown a modification similar to that of Fig. 6. Here the outer strip (25 of Fig. 6) is omitted and two pieces, 36 and 37 of angle section have two of the legs 38 and 39 thereof welded to opposite sides of the web 1 by welds corresponding to the welds 15 and 16 of Fig. 2.

The I-beam of Figs. 1 and 2 has two flanges 3—3, one on each end of the web 1, and it will be understood that a T-beam may be made simply by omitting one of the flanges 3, and the beams of Figs. 6, 7 and 8 may similarly employ one or two flanges.

I have illustrated the welding apparatus parts of Figs. 3 and 4 in simplified diagrammatic views, for inasmuch as welding machines and general welding methods employing roll type electrodes through which work to be welded may be continuously fed under pressure are well known.

From the foregoing it will appear that my invention in its broadest aspects contemplates making a beam by forming a flange with a deep groove therein, and seating the edge portion of a web in the groove and welding it thereto, but in the preferred practice of my invention, the flange and the groove therein will be formed by bending or rolling operations from relatively thin sheet metal.

My invention is not limited to the exact details of construction illustrated and described. Changes and modifications may be made within the spirit of my invention without sacrificing its advantages and within the scope of the appended claims.

I claim:

1. The method of making a metal beam which includes making a metal beam web in the form of an elongated strip of metal having opposite edge portions, making a unitary metal beam flange comprising laterally opposite integrally connected longitudinally extending flange portions, with a longitudinally extending wing on each flange portion, providing a longitudinally extending aperture between the wings, inserting an edge portion of the web into the aperture, and simultaneously welding the web edge portion and both wings together by electric current passed therethrough.

2. The method of making a metal beam which includes making a metal beam web in the form of an elongated strip of metal having opposite edge portions, making a unitary metal beam flange comprising laterally opposite integrally connected longitudinally extending flange portions, with a longitudinally extending wing on each flange portion, and unite the wings spaced apart to provide a longitudinally extending aperture between the wings, inserting an edge portion of the web into the aperture to dispose opposite faces of the sheet metal edge portion adjacent to and between the wings, and welding the web edge portion to the wings on longitudinally extending portions between the web edge portion faces and the wings.

3. The method of making a beam which includes forming an elongated sheet metal web having longitudinally extending edge portions, forming an elongated unitary sheet metal flange comprising laterally opposite integrally connected flange portions and an inwardly open groove extending longitudinally therealong, seating an edge portion of the web in the groove and welding the edge portion of the web to the side walls of the groove.

4. The method of making a beam which includes forming an elongated sheet metal web having a longitudinally extending substantially flat edge portion, forming a unitary elongated sheet metal flange having longitudinally extending wings thereon, with the wings spaced apart to provide a longitudinally extending groove between the wings having substantially parallel side walls, inserting the edge portion of the web into the groove with opposite faces of the edge portion of the web substantially engaging the side walls of the groove and welding the faces of the web edge portion to the side walls of the groove.

5. The method of making a beam which includes forming an elongated sheet metal web having a longitudinally extending substantially flat edge portion, forming a unitary elongated sheet metal flange comprising two superimposed layers of sheet metal and a pair of longitudinally extending wings, with the wings spaced apart to provide a longitudinally extending groove between the wings, inserting the edge portion of the web into the groove, welding the opposite faces of the sheet metal web to the opposite walls of the groove and welding together the two layers of the flange on longitudinally extending portions.

6. The method making a beam comprising a web and a flange which includes forming two opposite metal flange portions from sheet metal of angle section, integrally connecting the flange portions together with two of the angle legs disposed oppositely and in spaced relation, making a beam web in the form of a strip of sheet metal, disposing an edge portion of the web between the opposite angle legs and welding it to the legs on intermediate portions of the legs.

7. The method of making a beam which includes forming an elongated sheet metal web having a longitudinally extending edge portion, forming an elongated unitary sheet metal flange comprising integrally connected, laterally opposite, longitudinally extending flange portions and longitudinally extending wings integrally connected with the flange, and with the wings spaced apart to provide a longitudinally extending groove between the wings and the grooves having confronting side walls, inserting the edge portion of the web into the groove with opposite faces of the edge portion of the web substantially engaging the side walls of the groove, and welding the faces of the web edge portion to the side walls of the groove.

8. The method of making a beam comprising a web and a flange which includes forming two metal flange portions from sheet metal of angle section, making a common flange element in the form of an elongated strip of sheet metal, welding a leg of each of the flange portions to the common element with the legs disposed in spaced apart relation to provide a groove therebetween, making a beam web of a strip of sheet metal, disposing an edge portion of the web between said other leg and welding it to the said other legs on intermediate portions thereof.

9. The method of making a beam which includes making a beam web in the form of an elongated strip of sheet metal having opposite edge portions, making a metal flange by making an elongated strip of sheet metal and folding opposite edge portions of the metal inwardly along longitudinal lines on the same side of an intermediate portion of the strip and bending the edge portions upwardly to provide longitudinally extending opposite double thickness flange portions and longitudinally extending wings spaced apart, welding the double thickness metal together on longitudinally extending portions thereof, disposing an edge portion of the web between the wings and welding the edge portion to the wings.

10. The method of making a flange which includes forming two angle flange portions from sheet metal of angle cross section, forming a common flange element in the form of an elongated strip of sheet metal, superimposing a leg of each angle flange portion upon the common flange element and welding the legs thereto with the other legs disposed in mutually spaced relation by electric current passed through the common element and said superimposed legs on longitudinally extending portions thereof.

11. The method of making a beam flange which includes forming an elongated strip of sheet metal, folding opposite edge portions of the strip inwardly along longitudinal lines and over the same side of the intermediate portion of the strip to form double thickness oppositely extending flange portions and bending the edges of the strip upwardly to provide spaced apart wings and welding together the double thickness portions.

12. The method of making a beam which includes making a beam web in the form of an elongated strip of sheet metal having opposite edge portions, making a metal flange by making an elongated strip of sheet metal and folding opposite edge portions of the metal inwardly along longitudinal lines on the same side of an intermediate portion of the strip and bending the edge portions upwardly to provide longitudinally extending opposite double thickness flange portions and longitudinally extending wings spaced apart, roll welding the double thickness metal together on continuous longitudinally extending portions thereof, disposing an edge portion of the web between the wings and roll welding the edge portion to both wings simultaneously on continuous longitudinally extending portions thereof.

13. The method of making a beam flange which includes forming an elongated strip of sheet metal, folding opposite edge portions of the strip inwardly along longitudinal lines and over the same side of the intermediate portion of the strip to form double thickness oppositely extending flange portions and bending the edges of the strip upwardly to provide spaced apart wings and roll welding together the double thickness portions on continuous longitudinally extending portions thereof.

ARMAND A. PROBECK.